(12) United States Patent
Rosenwach et al.

(10) Patent No.: US 9,027,773 B2
(45) Date of Patent: May 12, 2015

(54) DIVIDED WOODEN TANK

(71) Applicant: Rosenwach Tank Co., LLC, Long Island City, NY (US)

(72) Inventors: Andrew Rosenwach, Long Island City, NY (US); Robert Redlien, Garden City, NY (US)

(73) Assignee: Rosenwach Tank Co., LLC, Long Island City, NY (US)

( * ) Notice: Subject to any disclaimer, the term of this patent is extended or adjusted under 35 U.S.C. 154(b) by 204 days.

(21) Appl. No.: 13/623,670

(22) Filed: Sep. 20, 2012

(65) Prior Publication Data

US 2014/0076903 A1 Mar. 20, 2014

Related U.S. Application Data

(60) Provisional application No. 61/660,461, filed on Jun. 15, 2012.

(51) Int. Cl.
| | |
|---|---|
| B65D 25/00 | (2006.01) |
| E03B 11/02 | (2006.01) |
| B65D 8/00 | (2006.01) |
| E03B 11/00 | (2006.01) |

(52) U.S. Cl.
CPC . *E03B 11/02* (2013.01); *B65D 9/04* (2013.01); *E03B 2011/005* (2013.01)

(58) Field of Classification Search
CPC .......... E03B 11/02; E03B 11/04; E03B 11/12
USPC ......... 220/567, 4.12, 565, 529; 217/4, 72, 75, 217/78, 91–98
See application file for complete search history.

(56) References Cited

U.S. PATENT DOCUMENTS

| | | | | |
|---|---|---|---|---|
| 244,883 | A * | 7/1881 | Gantt | 73/426 |
| 764,545 | A * | 7/1904 | Arkell | 217/3 CB |
| 1,956,928 | A * | 5/1934 | Quimby | 217/72 |
| 3,477,604 | A * | 11/1969 | Kridle | 217/12 R |
| 3,667,639 | A * | 6/1972 | Pfeil | 217/4 |
| 7,654,401 | B2 * | 2/2010 | Obergoenner | 217/65 |

* cited by examiner

*Primary Examiner* — Steven A. Reynolds
*Assistant Examiner* — King M Chu
(74) *Attorney, Agent, or Firm* — Ostrolenk Faber LLP

(57) ABSTRACT

A wooden water tank for a building has a wooden tank wall, a tank bottom and a wooden dividing wall across the tank defining at least two water compartments. There are attachments between the foregoing parts, and leak preventing connections between parts. Each wall is a sequential series of staves or boards secured together for leak prevention. The staves of the circumferential tank wall extend vertically. The staves of the dividing wall extend horizontally. The staves are all pressed together so that neighboring staves are sealed to each other preventing leakage through the walls. There are hoops and hoop segments around the circumferential wall, and connections to the hoops press the staves of the circumferential wall toward each other for sealing.

11 Claims, 8 Drawing Sheets

DIVIDED WOODEN TANK

CROSS-REFERENCE TO RELATED APPLICATION

This application is based on and claims priority to U.S. Provisional Application Ser. No. 61/660,461, filed on Jun. 15, 2012 and entitled "DIVIDED WOODEN TANK," the entire contents of which is hereby incorporated by reference.

BACKGROUND OF THE INVENTION

On a large number of commercial and industrial buildings, a large water tank is placed on the roof to supply water for standard uses and emergency uses, particularly if the regular water supply to the building is interrupted. The water tanks are typically either made of metal or of wood. The invention hereof is primarily concerned with a wooden water tank, wherein the body of the tank is entirely of wood, although it may be applicable to a wood tank that is all or in part clad with a metal covering.

A typical water tank has an undivided water compartment that is not internally divided into two or more compartments. If the interior of the tank is divided into two or more compartments or chambers, they are preferably sealed from each other so as to provide that number of separate, and independently controllable water supplies from a single tank. Of those water tanks with separate compartments, it is only known to use tanks made of metal and to separate the compartments by placing dividing walls within the metal tank. When the tank is of metal, the compartments dividing wall is also of metal and the tank is assembled by attaching, e.g. by welding or other leak resistant connection, the dividing wall to the interior of the tank.

Applicant is unaware and prior art is not known which discloses a water tank, particularly of the type used on the roof of a building, which is a wooden tank that is internally divided into compartments and particularly a wooden tank that is divided by a wooden dividing wall.

Wooden tanks have certain benefits, including preference by a customer, satisfying local building codes, local availability of materials, sealable against leakage during construction and extended seal due to the effect of water on wood, minimal prolonged exposure of the water to metal due to wood surfaces and to attachment materials in the water, which may corrode unless made of more expensive corrosion resistant metal and other reasons known to persons of skill in the art.

SUMMARY OF THE INVENTION

A separated compartment divided wooden tank according to this disclosure is a preferably circular shape shell defining the wooden tank, since that is the shape that can best withstand the forces of clamping together the wood staves of which the tank shell and the dividing wall are preferably constructed. The staves forming the tank are preferably narrow width boards that extend over the full height of the tank. Neighboring staves have abutting edges in sealing contact over the entire height of the tank.

The compartment dividing wall (or walls) in the tank is also preferably comprised of a plurality of narrow width (i.e., short height when the wall is assembled) boards or wood staves. Those boards or staves may be arrayed horizontally, one atop the other, and the abutting edges of neighboring staves or boards are in sealing contact across the entire width of the dividing wall. The dividing wall is securely attached to the interior of the wood tank wall.

All of the adjacent neighboring staves of the tank and adjacent neighboring boards or staves of the dividing wall and the connections between the dividing wall(s) in the tank and the wall (shell) of the tank and the floor of the tank are all securely attached, as described below, to seal the tank, the dividing wall(s) and the connections between the dividing wall(s) and the tank and the tank bottom wall, thereby forming two or more essentially leak proof compartments in the same tank. The compartments so formed are independent of each other so that one may be used, filled, emptied, etc. without affecting the other(s). Although two compartments are described above and in the following more detailed description, the tank may be divided by dividing walls into more than two separate compartments, using dividing walls formed of wood in the manner described above. The attachments between tank parts preferably avoid the use of possibly toxic adhesives and connecting elements between tank parts and eliminates or minimizes the use of possible corrodible metal within the tank, including rods, beams and fastenings exposed to water in the tank.

Several types of element fastenings and stave clamping devices are used for the tank. They may include some or all of the following. Several hoops wrap around the outside of the tank at spaced apart height intervals along the tank. The hoops may be drawn tight, squeezing the abutting edges of neighboring vertical staves together as the hoops bias the staves together to seal neighboring staves against each other to prevent leakage through the tank wall.

Sets of axially oriented and axially extended beams are arrayed at spaced intervals over the cross direction, e.g., radial width along the dividing wall. Those beams are clamped against opposite sides of the wall, usually in opposing pairs. They clamp the individual horizontal boards of the dividing wall in vertical alignment.

Elongate first truss rods extend between nearly oppositely located staves around the tank. The first truss rods are tightened to the respective staves to urge nearly opposite staves of the tank wall toward each other, particularly in the vicinity of a connection between the dividing wall and the tank wall. The first truss rods or other types of connections draw the tank wall against the lateral end edges of the dividing wall and against the periphery of the tank bottom. The first truss rods also may pass through the axially extended beams. Connections for the beams located at the top and the bottom of the dividing wall squeeze the boards of the dividing wall together from top to bottom for that wall, sealing that wall against leakage.

There may be second, generally radial truss rods extending from a fixture on the dividing wall out to the wall of the tank at intervals around the circumference of the tank. These rods are also attached at the tank wall and tightened to bias the staves of the wall radially inward.

All of the rod connections to and through the walls and the beams are tightened where appropriate and possible, using preferably non-corroding metal connections. Essentially all of the numerous adjacent parts are drawn together by tightened rods for clamping parts to prevent leakage between adjacent connected parts.

DESCRIPTION OF PREFERRED EMBODIMENTS

Alternative embodiments of wooden tanks with a dividing wall may be envisioned by one skilled in the art.

Figure 1:
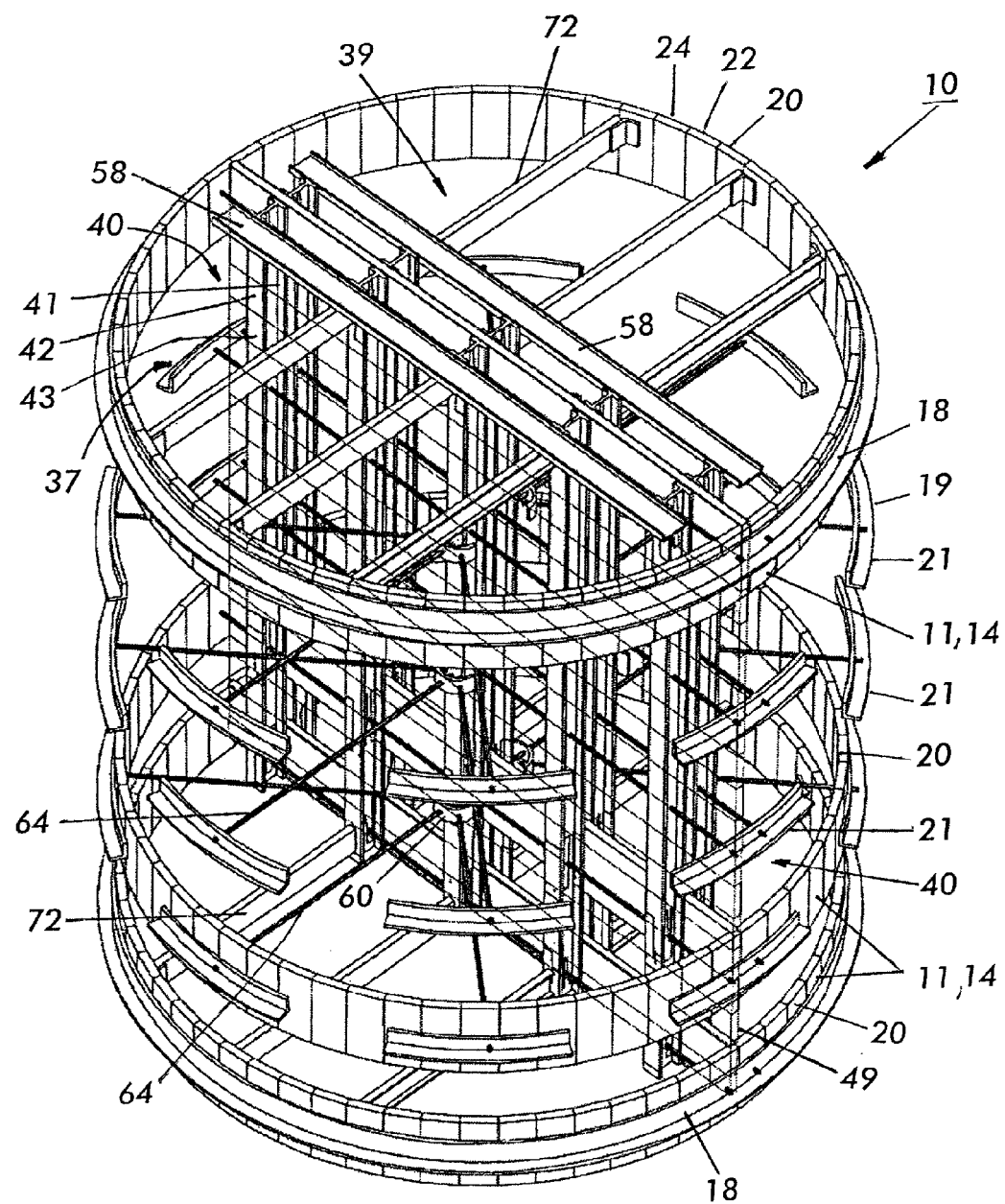
FIG. 1 is a schematic perspective view of a first embodiment of a compartmented wooden water tank. Some elements are partially removed to permit viewing.
Figure 8:
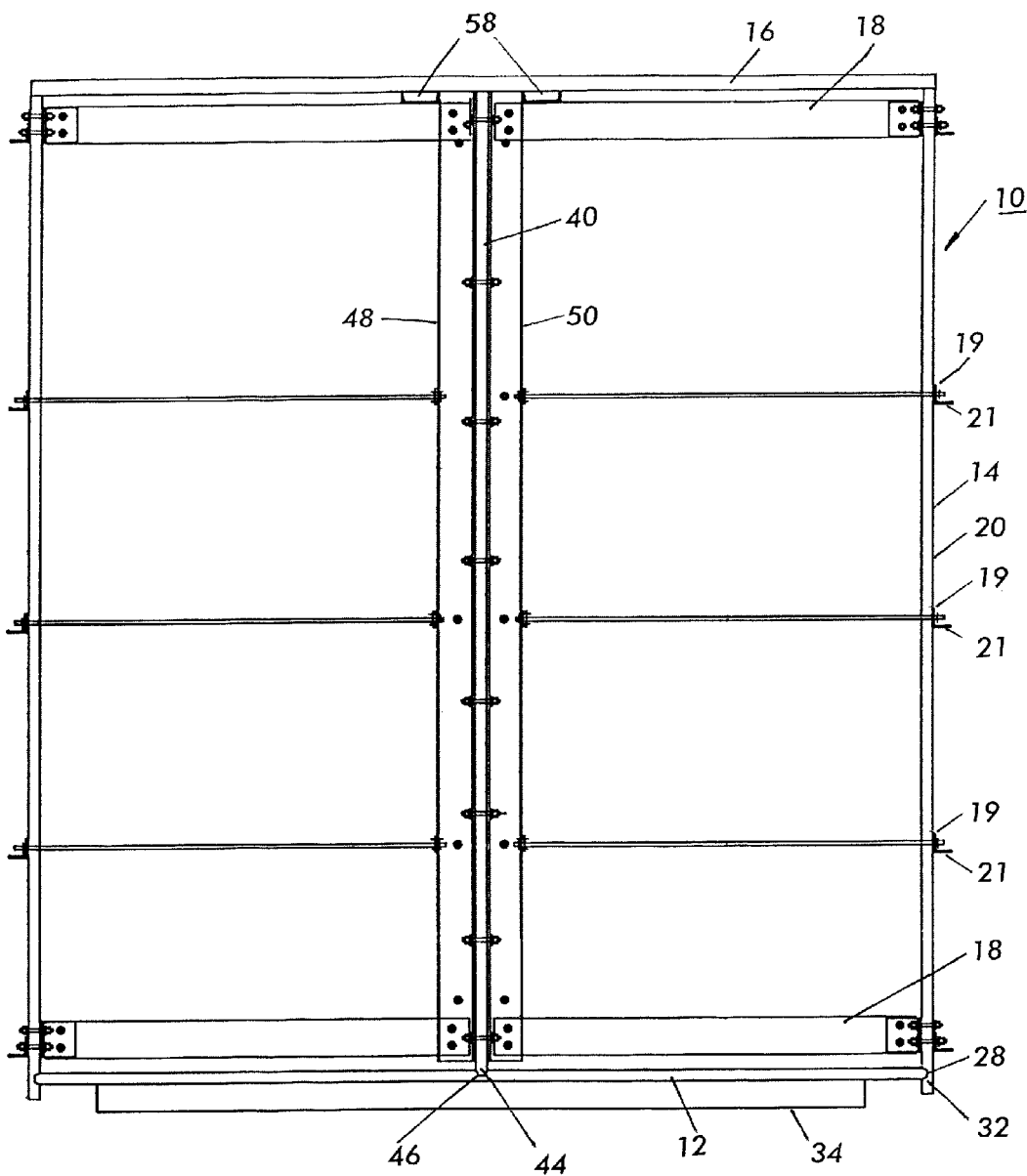
FIG. 8 is an elevational, cross-sectional view of the tank in FIG. 1.

In a first embodiment of FIGS. 1, 8, a tank 10 includes a cylindrical shell 11 comprised of wood staves and includes a flat wood tank bottom or floor 12 to which a sidewall 11, 14 of the tank is attached. There is wood dunnage 34 below the floor 12 which supports and stiffens the floor against the weight of water above the floor. The open top of the tank is closed by a tank top 16 also preferably of wood. The top 16 of the tank is also leakage resistant, but the water level does not pass over the top of the tank and there is little danger of leakage in or out. There is no pressure head from water above the top of the tank, although that pressure head is present based on water above the tank bottom. In accordance with the preferred embodiments of the invention, the bottom 12 of the tank and the sidewall 14 of the tank are wood constructions, without metal as one of the elements of those tanks, except for fastening and clamping devices, described below.

The tank 10 is typically about 12 to 18 feet in height and about 12 to 18 feet in diameter as the designer of a specific tank designates. These dimensions are a matter of choice and are dependent in part upon the size and configuration of the building for which the tank is provided the desired size and water storage capacity, and the duration of a water storage in the tank.

The horizontal cross-section of the tank shell 11 is circular, as that is a preferred shape for supporting the tank against radial direction collapse when pressure is applied to the tank by hoops 18 that stiffen and tension the tank wall 14 to maintain the shape of the tank without collapse.

The tank shell wall is comprised of many individual narrow width wooden staves or boards 20, 22, 24, et al. of the height or the length of the tank. Lateral edges of adjacent staves are held next to one another to define the circular cylinder sidewall 14 of the tank.

A plurality of hoops 18, 19 each extending completely around the outside of the tank wall 14, are arrayed at selected axially spaced height intervals of, for example, about one foot apart. That spacing is a matter of choice. In this embodiment, the top and bottom hoops 18 of the tank are unbroken around the entire circumference. The three intermediate hoops 19 are comprised of circumferentially separated arcuate segments 21, each of L-shaped cross section. Each segment is wrapped over a respective group of adjacent staves. The segments are drawn radially inward by later described second radial truss rods. The hoops are typically of metal. The hoops are strong enough to retain the below described dividing wall 40 between tank compartments sealed to the shell of the tank, when the compartments are filled or empty. The unbroken hoops 18 are tightened around the wall 14 by standard tightening devices 23 for a hoop, which may include opposing separated tabs joined by a connection element.

The wall 14 and its staves 20, 22, 24, et al. are arranged around the floor 12 of the tank, which thereby defines the diameter and circumference of the tank wall. A leakage preventing groove 28 passing around the bottom of the tank wall through each of the staves 20, 22, 24 is of a vertical cross-section like the peripheral edge 32 of the tank floor 12, and that edge projects into and is received by the groove 28 at the bottom of the wall. The edge 32 fitted into the groove 28 provides a liquid leakage preventing fit. Additional leakage resistant elements, such a plastic gasket placed in the base of the groove 28 may help prevent leakage.

A wooden dividing wall 40 in the tank extends the height of the tank and across the full width of the tank preferably along a diameter of the cylindrical tank. This defines two water containment compartments 37, 39 at opposite sides of the wall 40. But, the wall could be at a chord off a diameter, resulting in two compartments that are separated by the wall being of different volumes.

The dividing wall 40 is preferably comprised of a stack of boards or staves 41, 42, et al. for example, of the type of which the wall 14 of the tank is fabricated, although the latter is not required. The dividing wall 40 may be comprised of boards or staves of different width (vertical height) and thickness than the staves 20, 22, 24 forming tank wall 14. It has thus far been found preferable to have at least most or all of the individual boards 41, 42 of the dividing wall be short in axial direction height and extend over the entire diameter or chord of the tank, defining a vertical stack of the short height, long width boards. However, the dividing wall might instead be arranged with a plurality of adjacent staves extending in a vertical direction, like the outer shell wall 14.

The dividing wall 40 should be securely attached to the sidewall 14 of the tank and to the floor 12 of the tank so that the dividing wall does not permit leakage across that wall between the compartments 37 and 39, no matter how each of the compartments might be differently filled.

The bottom edge 44 of the dividing wall 40 is received in a correspondingly shaped groove 46 in the floor 12 of the tank. The edge 44 and the groove 46 are respectively so sized and shaped as to seal against leakage of water past the bottom edge of the wall. An additional leakage prevention device may be supplied at the groove, such as a strip of flexible plastic, or gasket or washer material, or the like. That same type of connection is not required for the top of the tank, because there is no pressure head of water above the tank that is urged to pass around the wall.

Each lateral edge 49 of the dividing wall 40 is received in a correspondingly shaped groove 51 in diametrically opposite staves 53 and 54 of the tank wall 14. The edge 49 of the dividing wall and the groove 51 in the tank wall are shaped and sized to prevent leakage of water past the dividing wall. An additional element to prevent leakage, such as a strip of a plastic material et al., may be placed along the groove to prevent leakage.

Especially when the dividing wall 40 is comprised of a plurality of boards 41, 42 extending horizontally, there is a possibility that water pressure on the wall, warping of the wood or some shifting of the boards might occur, so that the boards of the dividing wall might become misaligned above one another and present leakage paths for water past the wall. This is not likely to happen to the staves or boards of the outer wall 14 of the tank because the hoops 18, 19 hold those staves tightly and the staves held tightly by the hoops are not likely to deform or shift.

At spaced apart positions across the (diametric) width of the dividing wall 40, there are pairs of opposing I-shaped support beams 48 at one side of the wall and 50 at the opposite side of the wall. Each of the I-beams extends the full height of the dividing wall 40. Each pair of beams is connected by a plurality of fasteners 52 between the I-beams. When the fasteners 52 are tightened, the beams are pressed against the opposite sides of the wall 40 and that fixes the boards 41, 42, et al. of the dividing wall in alignment over the height of the wall and keeps the adjacent horizontal boards abutting to seal the dividing wall.

First truss rods 54, 56 are spaced from, but near to, respective opposite sides of the dividing wall 40. With the dividing wall on a diameter of the tank, each of the first truss rods 54, 56 extends on a chord across the width of the tank. The first truss rods pass through holes 57 formed in the I-beams 48, 50. The first truss rods pass through the side walls of the tank. The above described hoop segments 19 have holes that receive the ends 59 of the first truss rods 54, 56, so that the first truss rods are tightened into the hoop segments 19 on the outside of the shell of the tank. This pulls radially inward the staves of the tank wall including the staves that receive the first truss rods 54 and 56. This tightens the hoop segments 19 against the staves. There is a respective channel cover 58 at the top of the tank just outward of the truss rods 54 and 56.

Figure 4:
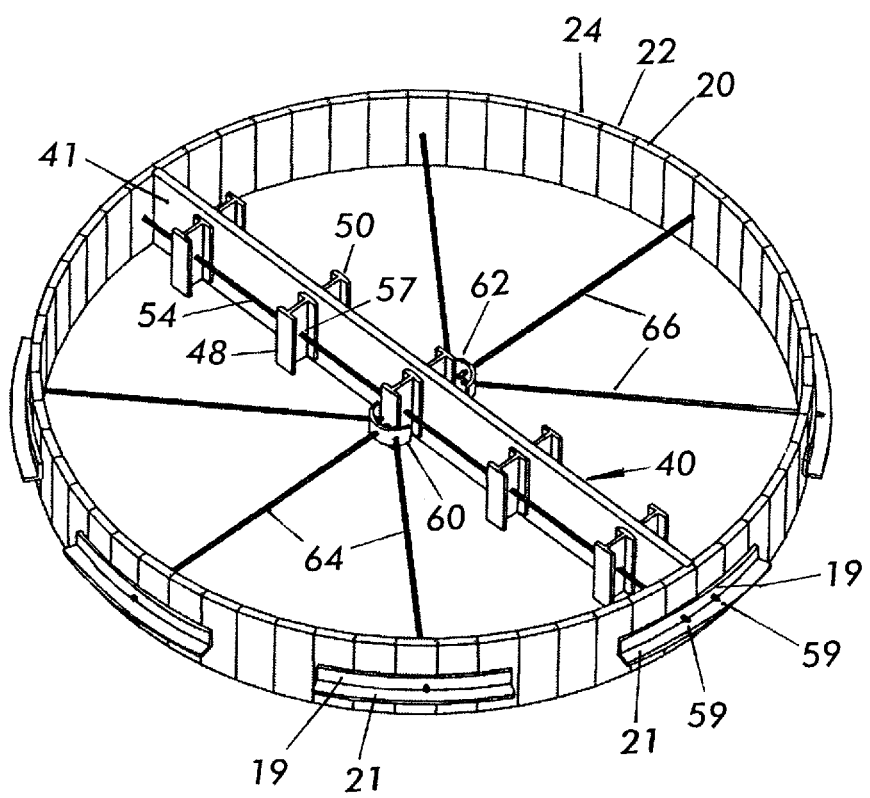
FIG. 4 is a perspective view of a middle section of the tank in FIG. 1.
Figure 5:
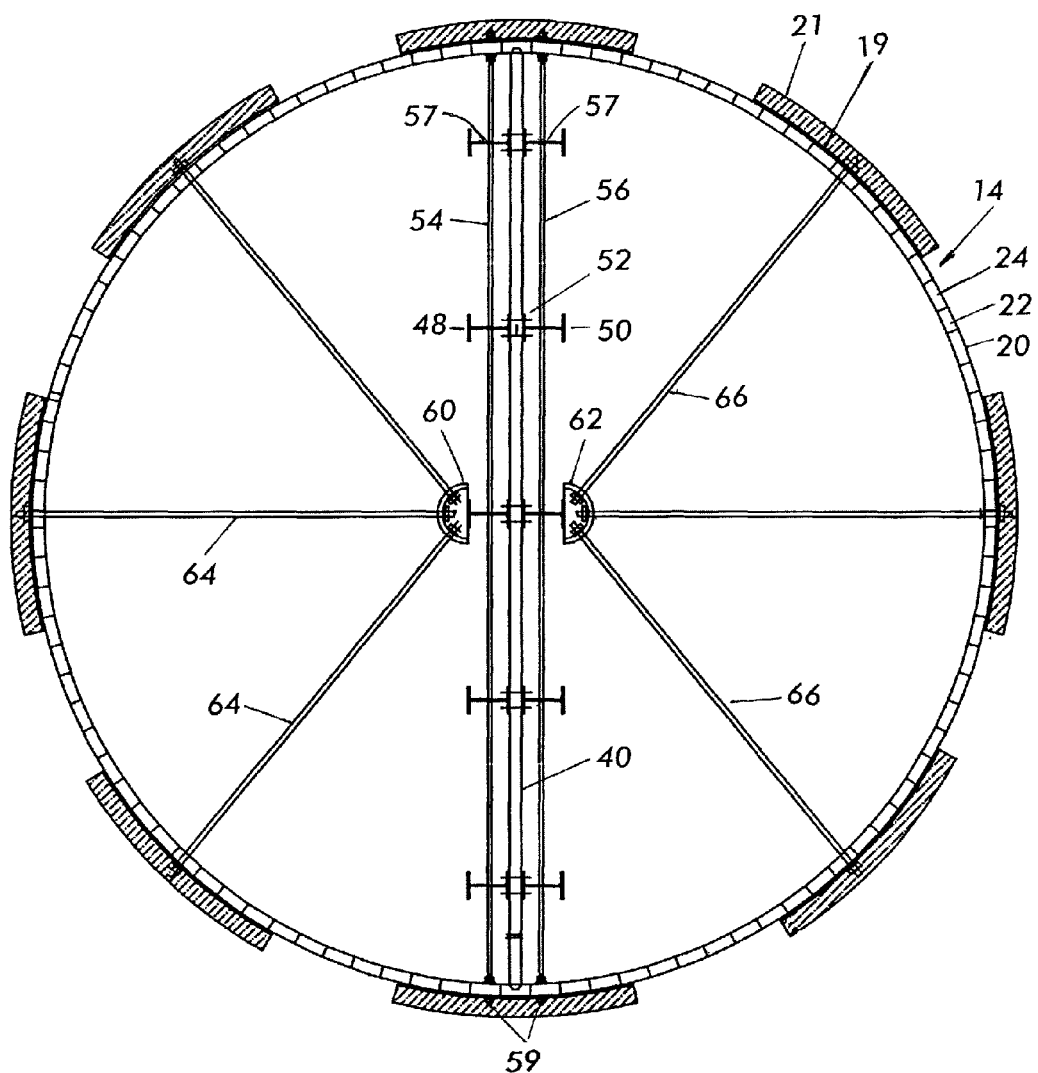
FIG. 5 is a view from above at a cross section at the middle section of the tank in FIG. 1.
Figure 6:
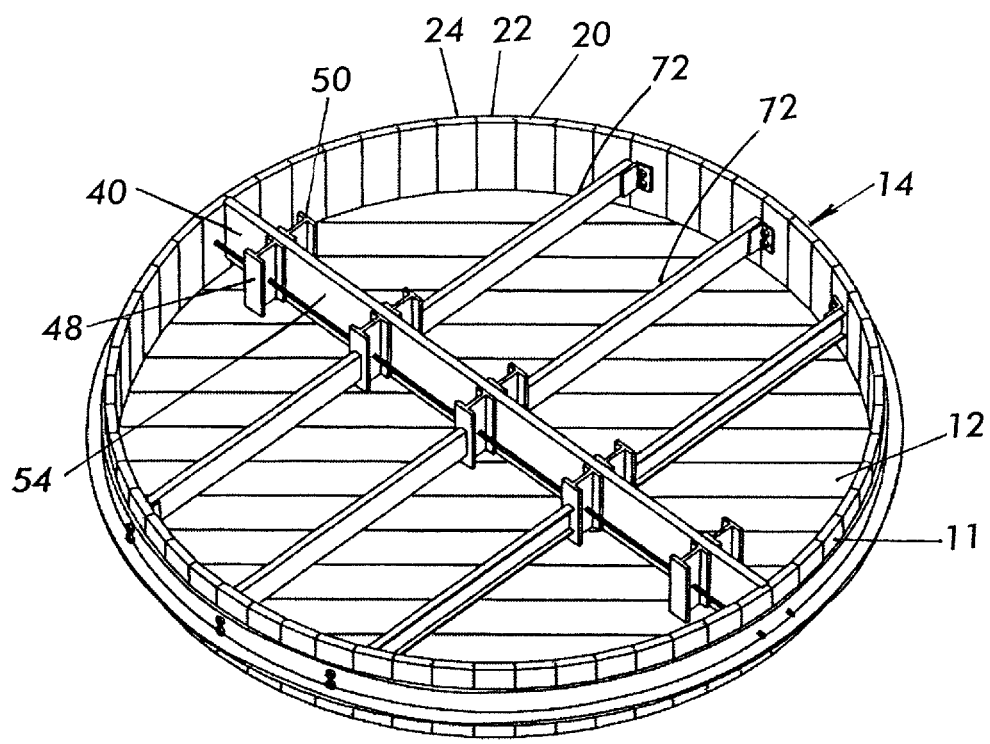
FIG. 6 is a perspective view from above at a cross section at the bottom section of the tank in FIG. 1.
Figure 7:
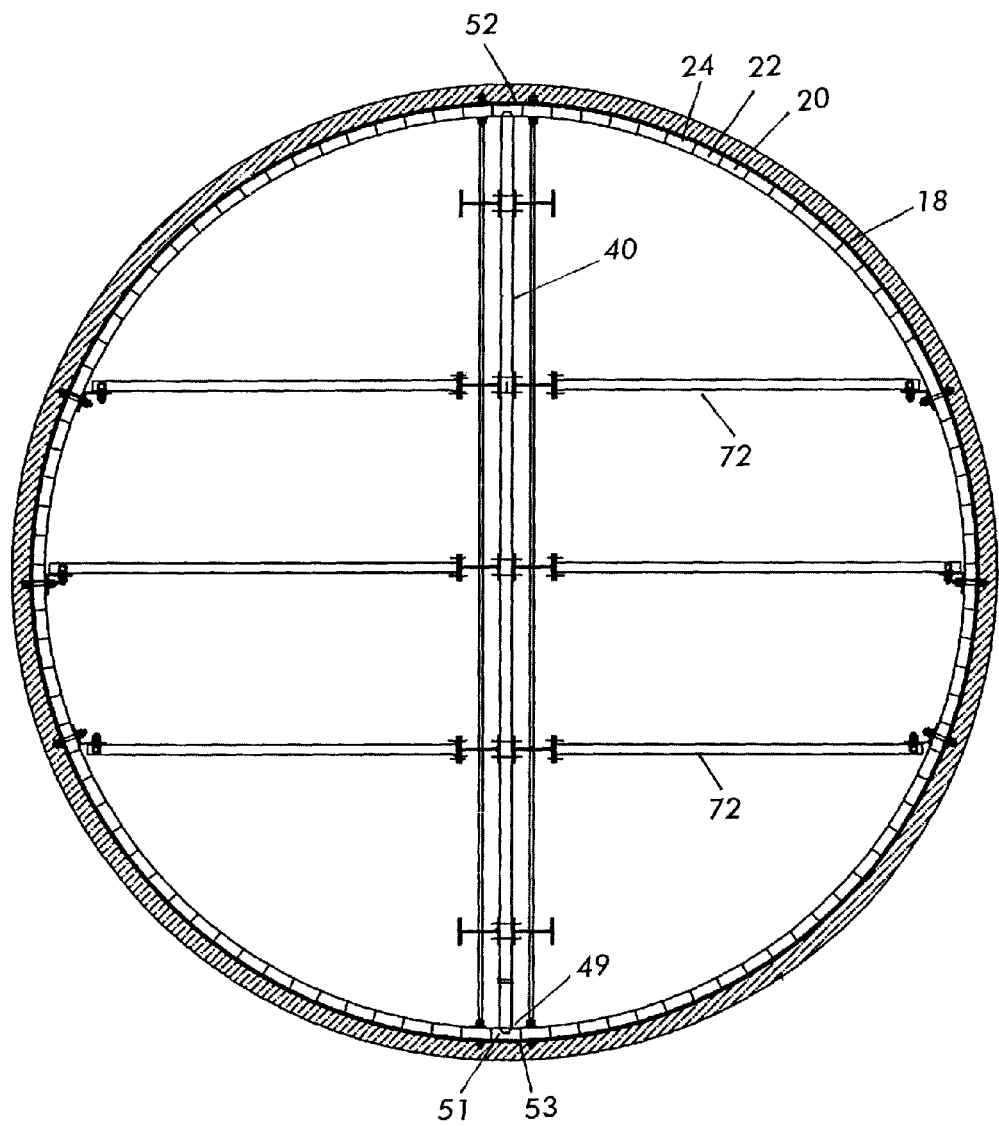
FIG. 7 is a view from above at a cross section at the bottom section of the tank in FIG. 1.

In FIGS. 4 and 5, there is a fixture 60 and 62 at each side of the dividing wall 40 just below the height of a respective first truss rod 54 or 56. The fixtures 60, 62 are at approximately the radial center of the dividing wall along the diameter of the tank wall 11.

At each of the fixture 60, 62, there is a respective plurality of second, radial truss rods 64 at one fixture 60 and 66 at the other fixture 62. Because the fixtures 60, 62 are outward of the dividing wall, the second truss rods 64, 66 are not precisely radial and the second truss rods 64 at one side of the dividing wall 40 are not aligned with the second truss rods 66 at the other side of the dividing wall 40. Each of the plurality of radial truss rods at each height level of the hoop segments 21 is fixed at the respective fixture 60, 62 and extends through a stave in the wall 14 of the tank to be secured there by a fastener located at the L cross-section hoop segment 21 where the second truss rods are tightened. Tightening of the second truss rod 64, 66 draws the hoop segments 21 inward against the tank staves on which the hoop fragments rest and pulls the hoop segments radially inward, so that the hoops 18 at the top and bottom and the hoop segments 19, 21 bias the staves of the tank wall inward.

Figure 2:
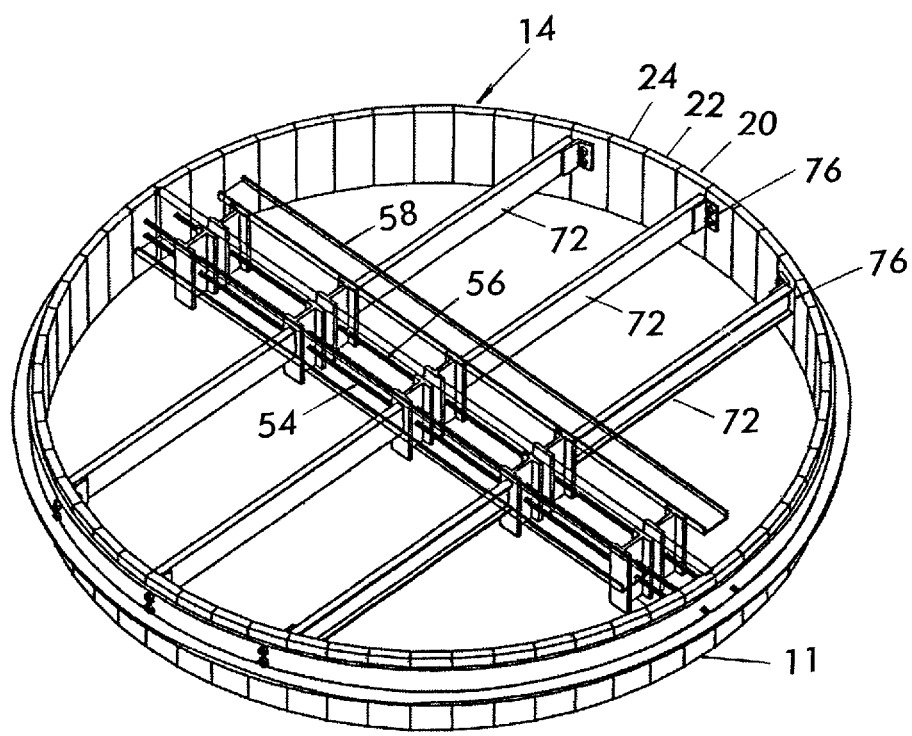
FIG. 2 is a perspective view of a top section of the tank in FIG. 1.
Figure 3:
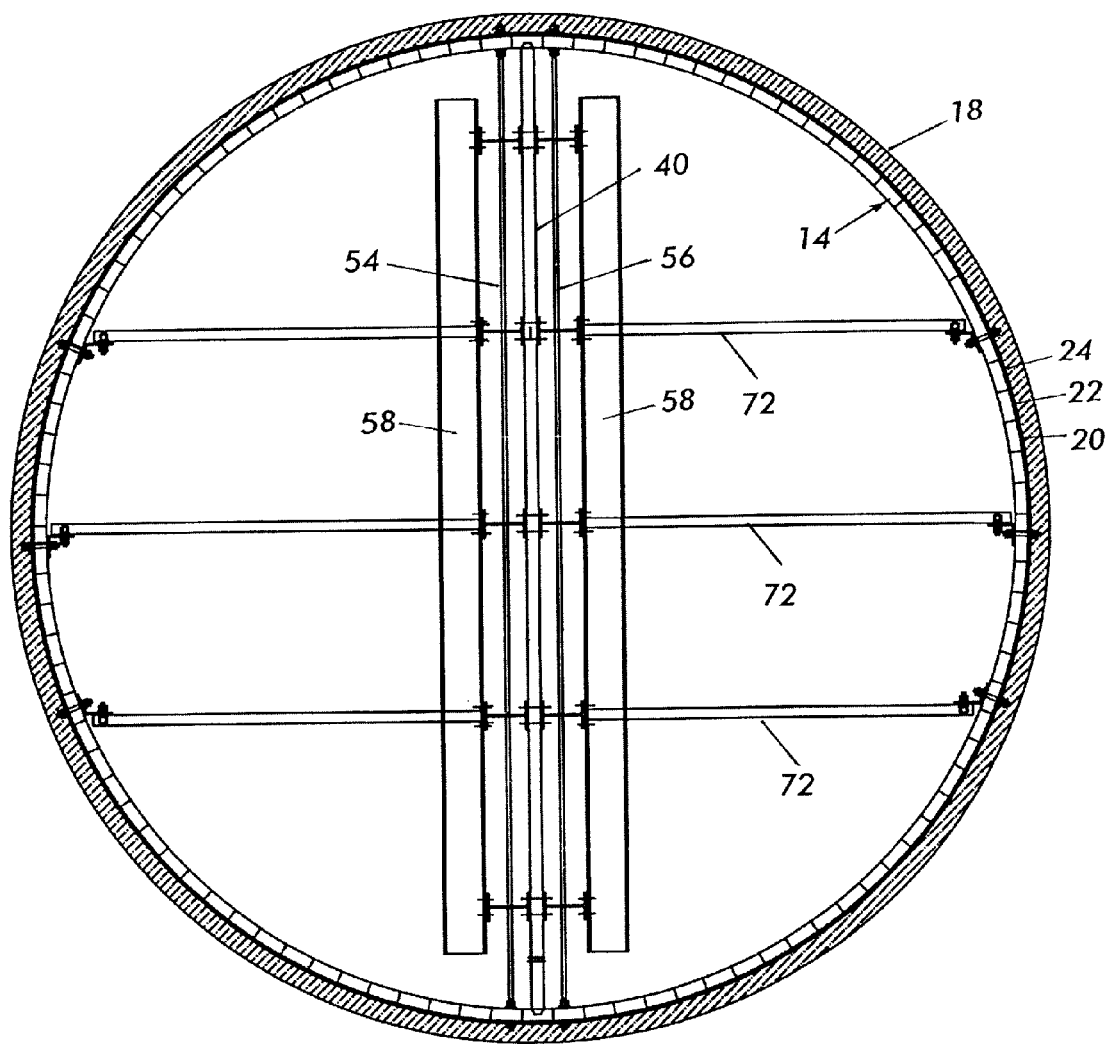
FIG. 3 is a view from above into the top section of the tank in FIG. 2.

To further secure the staves of the tank wall, at height intervals along the height of the tank wall 14 below the first truss rods, there are a plurality, with three being illustrated, horizontal channels 72 at the diameter and channels 74 at chords across the tank. The horizontal channels are attached at fastenings 76 located at the opposite ends of the horizontal channels to respective staves at the side wall 14 of the tank. As seen in FIG. 2, each horizontal channel 72, 74 either passes through or at least is connected to the vertical I-beams 48, 50. The horizontal channels further support the staves of the tank wall 14.

While the tank 11, 12, 14 and the dividing wall 40 are made of wood, the internal first and second truss rods 54, 56, 64, 66 which extend across and through the tank are preferably of stainless steel, so that they will not corrode in the presence of water. The internal channels and beams, which are also exposed to water, are preferably of a coated steel also to prevent corrosion of those steel elements. The external hoops and compression rings 18 and 19 are preferably of galvanized steel. Although they are not exposed to the water, nonetheless their corrosion is undesirable as it could weaken the important tightening for clamping parts.

In this embodiment, there is secure mounting of the wooden dividing wall inside the wooden tank with both the tank wall and the dividing wall being comprised of staves or narrow elongate boards.

The respective dimensions of the boards or staves is a matter of choice for the particular size, shape and wooden material of the tank. The choice of wood for the tank is also a matter of choice so long as it has the required strength and stiffness, imperviousness to water, reduced warping, long life, and other characteristics one would want from a wood structure continuously subjected to water.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A divided wooden tank, comprising:
    a circumferential wall comprised of wood and defining an enclosed chamber;
    a dividing wall extending across the chamber, the dividing wall being sealed to the circumferential wall to define two separate compartments, the dividing wall being impervious to liquid;
    a bottom for the tank below the circumferential wall;
    the dividing wall being sealingly connected to the bottom of the tank and to the circumferential wall of the tank so as to seal the compartments against leakage of water through the circumferential wall of the tank and past the dividing wall;
    wherein the circumferential tank wall is comprised of a plurality of staves extending vertically and positioned next to each other, and devices at the tank for holding the staves in their enclosed circumferential wall orientation;
    wherein the dividing wall is comprised of a plurality of blocks or staves of wood all extending along a chord or the diameter of the tank dividing the tank into the compartments, wherein the staves or blocks of wood are supported against each other in a vertical array so as to prevent leakage past the staves or blocks of the dividing wall; and
    first devices for urging the staves or blocks of the dividing wall to be pressed together to prevent leakage.

2. The divided wooden tank of claim 1, further comprising a second device at the circumferential tank wall for urging the staves of the circumferential tank wall that are positioned next to each other to be urged together to prevent leakage through the circumferential wall.

3. The divided wooden tank of claim 1, further comprising the dividing wall having opposite sides, with each side in one of the two compartments;
    a first beam extending in an axial direction of the tank along the first side of the dividing wall, and a second beam, opposing the first beam, extending axially along the second side of the dividing wall; and
    third devices urging the first and second opposing beams toward each other and against the respective sides of the dividing wall to position the blocks or staves of the dividing wall above one another and to avoid misalignment of the blocks or staves of the dividing wall.

4. The divided wooden tank of claim 1, further comprising a respective plurality of truss rods extending between and being secured to the dividing wall and to the circumferential tank wall, and devices at the truss rods, the dividing wall and the circumferential tank wall for drawing the circumferential tank wall inward of the tank and for supporting neighboring staves of the circumferential tank wall against each other to seal the circumferential wall of the tank.

5. The divided wooden tank of claim 4, wherein the second devices at the circumferential tank wall for urging the staves comprises a plurality of hoops around the circumferential tank wall, wherein the hoops are tightened against the staves of the circumferential tank wall for urging neighboring staves of the circumferential tank wall together to seal the circumferential wall against leakage.

6. The divided wooden tank of claim 5, wherein there is at least one intermediate level hoop and an upper and lower hoop respectively above and below the intermediate level hoop;
   the upper and lower hoops being continuous hoops around the circumferential wall;
   the at least one intermediate level hoop being divided into a plurality of hoop segments around the outside of the circumferential tank wall and each hoop segment engaging a respective plurality of the staves of the circumferential tank wall;
   a respective one of the truss rods extending through the circumferential tank wall and being connected to one of the hoop segments while also being connected at the dividing wall, and the respective truss rod being operative upon the connections being made for drawing the respective one of the hoop segments inward of the circumferential tank wall for holding neighboring ones of the staves of the circumferential wall to press against each other and seal the circumferential wall.

7. The divided wooden tank of claim 5, wherein at least one hoop is divided into a plurality of hoop segments around the outside of the circumferential tank wall and each hoop segment engaging a respective plurality of the staves of the circumferential tank wall; and
a respective one of the truss rods extending through the circumferential tank wall and being connected to one of the hoop segments while also being connected at the dividing wall, and the respective truss rod being operative upon the connections being made for drawing the respective one of the hoop segments inward of the circumferential tank wall for holding neighboring ones of the staves of the circumferential wall to press against each other and seal the circumferential wall.

8. The tank of claim 1, wherein devices for urging neighboring staves together comprise a plurality of hoops around the circumferential wall of the tank and the hoops being tightened to urge the staves inward and cause the staves to press together for sealing the circumferential wall.

9. The divided wall tank of claim 4, further comprising additional connecting devices between each of the beams at the dividing wall and at least one stave at the circumferential wall, the additional connecting devices being configured for drawing the staves of the circumferential wall inward and supporting the circumferential wall and urging the neighboring staves of the circumferential wall together for sealing the tank.

10. The divided wooden tank of claim 8, wherein the devices at the circumferential tank wall for urging the staves comprises a plurality of hoops around the circumferential tank wall, wherein the hoops are tightened against the staves of the circumferential tank wall for urging neighboring staves of the circumferential tank wall together to seal the circumferential wall against leakage.

11. The divided wooden tank of claim 1, wherein the devices at the circumferential tank wall for urging the staves comprises a plurality of hoops around the circumferential tank wall, wherein the hoops are tightened against the staves of the circumferential tank wall for urging neighboring staves of the circumferential tank wall together to seal the circumferential wall against leakage.

* * * * *